US 9,244,462 B2

(12) United States Patent
Pedersen (10) Patent No.: US 9,244,462 B2
(45) Date of Patent: Jan. 26, 2016

(54) VEHICLE TRAJECTORY PLANNING FOR AUTONOMOUS VEHICLES

(71) Applicant: Nissan North America, Inc., Franklin, TN (US)

(72) Inventor: Liam Pedersen, San Francisco, CA (US)

(73) Assignee: NISSAN NORTH AMERICA, INC., Franklin, TN (US)

(*) Notice: Subject to any disclaimer, the term of this patent is extended or adjusted under 35 U.S.C. 154(b) by 8 days.

(21) Appl. No.: 14/291,802

(22) Filed: May 30, 2014

(65) Prior Publication Data
US 2015/0346723 A1 Dec. 3, 2015

(51) Int. Cl.
*G05D 1/00* (2006.01)
(52) U.S. Cl.
CPC .................. *G05D 1/0088* (2013.01)
(58) Field of Classification Search
CPC .................................................. G05D 1/0088
USPC ........................................................... 701/25
See application file for complete search history.

(56) References Cited

U.S. PATENT DOCUMENTS

| 8,606,498 | B2* | 12/2013 | Pesterev et al. ............... 701/400 |
| 2008/0167814 | A1* | 7/2008 | Samarasekera et al. ...... 701/213 |
| 2008/0208454 | A1* | 8/2008 | Pesterev et al. ............... 701/206 |
| 2010/0072075 | A1* | 3/2010 | Shindo et al. ................. 205/538 |
| 2013/0006473 | A1* | 1/2013 | Buerkle et al. .................. 701/41 |
| 2013/0030606 | A1* | 1/2013 | Mudalige et al. ................ 701/2 |
| 2013/0129191 | A1* | 5/2013 | Jin et al. ........................ 382/154 |

OTHER PUBLICATIONS

Thomas Howard and Alonzo Kelly, "Optimal Rough Terrain Trajectory Generation for Wheeled Mobile Robots," International Journal of Robotics Research, Feb. 2007, pp. 141-166, vol. 26, No. 2, http://www.ri.cmu.edu/publication_view.html?pub_id=5739.
Macek et al., "Path Following for Autonomous Vehicle Navigation Based on Kinodynamic Control," Journal of Computing and Information Technology, CIT 17, 2009, 1, 17-26.
Wan et al., "Lane Change Behavior Modeling for Autonomous Vehicles Based on Surroundings Recognition," International Journal of Automotive Engineering 2 (2011) 7-12.

(Continued)

*Primary Examiner* — Mussa A Shaawat
*Assistant Examiner* — Michael Berns
(74) *Attorney, Agent, or Firm* — Young, Basile, Hanlon & MacFarlane, P.C.

(57) ABSTRACT

A method for controlling an autonomous vehicle includes obtaining, by one or more processors, information describing a current state of the autonomous vehicle and a goal state of the autonomous vehicle; determining, by the one or more processors, an initial vehicle trajectory from the current state of the autonomous vehicle to the goal state of the autonomous vehicle; determining, by the one or more processors, an optimized vehicle trajectory based the initial trajectory and a velocity profile by applying numerical minimization to minimize a trajectory length value and a lateral acceleration value; and controlling the autonomous vehicle to traverse the optimized vehicle trajectory.

21 Claims, 5 Drawing Sheets

(56) References Cited

OTHER PUBLICATIONS

Reece et al., "A Computational Model of Driving for Autonomous Vehicles," School of Computer Science, Carnegie Mellon University, Apr. 1991, CMU-CS-91-122, Pittsburgh, Pennsylvania 15213.

Taylor et al., "A Comparative Study of Vision-Based Lateral Control Strategies for Autonomous Highway Driving," Computer and Information Science Dept. of the University of Pennsylvania and EECS Dept. of U. C. Berkeley, Philadelphia, Pennsylvania and Berkeley, California.

\* cited by examiner

VEHICLE TRAJECTORY PLANNING FOR AUTONOMOUS VEHICLES

BACKGROUND

Autonomous vehicles are vehicles having computer control systems that attempt to perform the driving tasks that are conventionally performed by a human driver. Stated generally, the purpose of a control system of an autonomous vehicle is to guide the vehicle from a current location to a destination. In reality, multiple constraints are placed on the control system. For example, the route chosen by the control system might be constrained to travel along a public roadway, to avoid obstacles, and to travel in conformance with traffic laws. Travel upon public roadways along a determined route from a current location to a destination provides a basis for defining a geometric path that the vehicle will follow. Viewing vehicle control as a simple geometry problem will not, however, lead to acceptable control of the vehicle.

SUMMARY

The disclosure relates to systems and methods for vehicle trajectory planning.

One aspect of the disclosed embodiments is a method for controlling an autonomous vehicle. The method can include obtaining, by one or more processors, information describing a current state of the autonomous vehicle and a goal state of the autonomous vehicle; determining, by the one or more processors, an initial vehicle trajectory from the current state of the autonomous vehicle to the goal state of the autonomous vehicle; and determining, by the one or more processors, an optimized vehicle trajectory based the initial trajectory and a velocity profile by applying numerical minimization to minimize a trajectory length value and a lateral acceleration value.

Another aspect of the disclosed embodiments is a control apparatus for an autonomous vehicle that includes one or more processors and one or more memory devices for storing program instructions used by the one or more processors. The program instructions, when executed by the one or more processors, cause the one or more processors to obtain information describing a current state of the autonomous vehicle and a goal state of the autonomous vehicle, determine an initial vehicle trajectory from the current state of the autonomous vehicle to the goal state of the autonomous vehicle, and determine an optimized vehicle trajectory based the initial trajectory and a velocity profile by applying numerical minimization to minimize a trajectory length value and a lateral acceleration value.

Another aspect of the disclosed embodiments is an autonomous vehicle. The autonomous vehicle includes a trajectory planning system having one or more processors and one or more memory devices for storing program instructions used by the one or more processors. The program instructions, when executed by the one or more processors, cause the one or more processors to obtain information describing a current state of the autonomous vehicle and a goal state of the autonomous vehicle, determine an initial vehicle trajectory from the current state of the autonomous vehicle to the goal state of the autonomous vehicle, and determine an optimized vehicle trajectory based the initial trajectory and a velocity profile by applying numerical minimization to minimize a trajectory length value and a lateral acceleration value. The autonomous vehicle also includes a steering device that is operable to change a steering angle of at least one steered wheel, and a steering control system operable output a steering control signal to the steering device for controlling operation of the steering device, wherein the steering control system generates the steering control signal based on the optimized trajectory.

BRIEF DESCRIPTION OF THE DRAWINGS

The description herein makes reference to the accompanying drawings wherein like reference numerals refer to like parts throughout the several views, and wherein.

DETAILED DESCRIPTION

When human occupants are present in an autonomous vehicle, vehicle control schemes that allow a vehicle to be controlled based on its dynamic limits (i.e. so that the vehicle does not lose traction), may not be acceptable to the occupants. For example, abrupt changes in vehicle direction can result in occupant discomfort, motion sickness, and decreased confidence in the autonomous system. Examples of maneuvers that involve abrupt changes in direction include U-turns, lane changes, and turning at intersections.

The methods, control systems, and vehicles described herein utilize a current state of an autonomous vehicle and a goal state of the autonomous vehicle to determine an initial vehicle trajectory from the current state to the goal state. An optimized vehicle trajectory is determined based the initial trajectory and a velocity profile by applying numerical minimization to minimize a trajectory length value and a lateral acceleration value.

Figure 1:
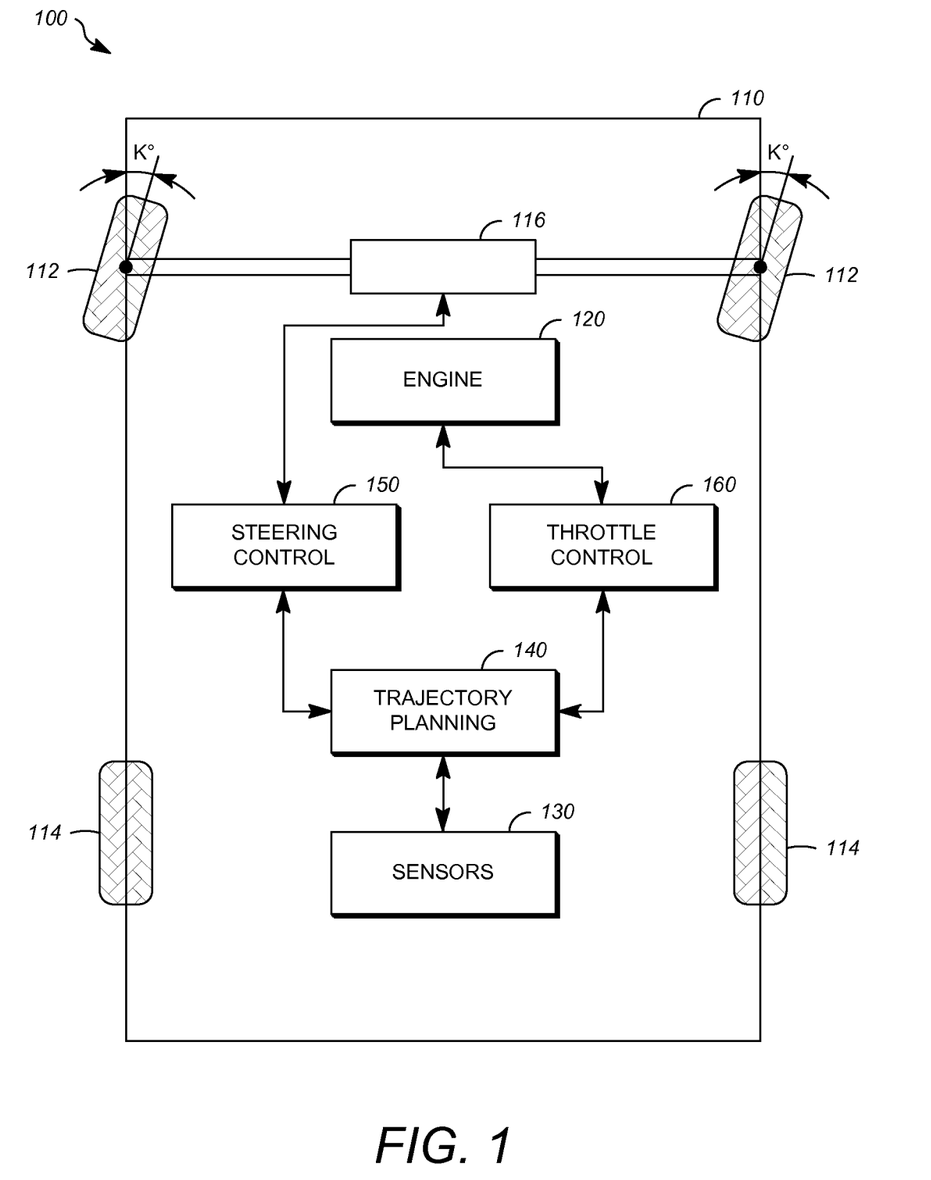
FIG. 1 is an illustration showing an autonomous vehicle.

FIG. 1 shows a vehicle 100, which is an autonomous vehicle that can be utilized as an environment for implementing the methods and control systems for vehicle trajectory planning that are disclosed herein. Except as otherwise noted, the vehicle 100 is conventional in nature. The systems and methods disclosed herein can be applied to many different types of vehicles of varied structural configurations, and thus, the disclosure herein is not limited to use with any particular kind of vehicle.

The vehicle 100 includes a chassis 110 that is fitted with conventional suspension, steering, braking, and drivetrain components. In the illustrated example, the chassis 110 is fitted with front wheels 112 and rear wheels 114. The front wheels 112 are steered wheels. That is, the front wheels 112 can be pivoted to a steering angle K under control of a steering device 116. The steering device 116 can be any conventional steering device, such as a rack and pinion steering system. The steering device 116 is mechanically coupled to the front wheels 112 to pivot them to the steering angle K. The steering device 116 can be electronically controllable. For example, the steering device 116 can include an electric motor that is operable to receive signals that cause operation of the steering device 116. For example, the steering device 116 can include a rack and pinion arrangement, where the rotational input of the rack is coupled to an electric motor in combination with a position sensor or encoder to allow the steering device 116 to cause the front wheels 112 to pivot to a desired steering angle K.

The vehicle 100 includes an engine 120. The engine 120 can be any manner of device or combination of devices operative to provide a motive force to one or more of the front wheels 112 or the rear wheels 114. As one example, the engine 120 can be an internal combustion engine. As another example, the engine 120 can be or include one or more electric motors. As another example, the engine 120 can be a hybrid propulsion system incorporating, for example, an internal combustion engine and one or more electric motors. Other examples are possible. The engine 120 is operable to drive one or more of the front wheels 112 and/or rear wheels 114 via conventional drivetrain components.

The vehicle 100 includes a plurality of sensors 130 that are operable to provide information that is used to control the vehicle. The sensors 130 are conventional in nature. Some of the sensors 130 provide information regarding current operating characteristics of the vehicle. These sensors can include, for example, a speed sensor, acceleration sensors, a steering angle sensor, traction-related sensors, braking-related sensors, and/or any sensor that is operable to report information regarding some aspect of the current dynamic situation of the vehicle 100.

The sensors 130 can also include sensors that are operable to obtain information regarding the physical environment surrounding the vehicle 100. For example, one or more sensors can be utilized to detect road geometry and obstacles, such as fixed obstacles, vehicles, and pedestrians. As an example, these sensors can be or include a plurality of video cameras, laser-sensing systems, infrared-sensing systems, acoustic-sensing systems, and/or any other suitable type of environmental sensing device now known or later developed.

The sensors 130 can also include navigation-related sensors. Examples of navigation related navigation-related sensors include a compass (e.g. a magnetometer), a satellite positioning system receiver (using, for example, the Global Positioning System), and a navigation system operable to obtain mapping and/or route information whether locally stored at the vehicle 100 or accessed remotely, such as by a wireless data transmission connection over any suitable protocol. These sensors 130 can be used to obtain information that represents, for example, a current heading of the vehicle 100, a current position of the vehicle 100 in two or three dimensions, a current angular orientation of the vehicle 100, and route information for the vehicle 100.

The vehicle 100 includes a trajectory planning system 140. The trajectory planning system 140 can include one or more processors (such as one or more conventional central processing units) that are operable to execute instructions that are stored on a computer readable storage device, such as RAM, ROM, a solid state memory device, or a disk drive.

The trajectory planning system 140 is operable to obtain information describing a current state of the vehicle 100 and a goal state for the vehicle 100, and, based on this information, to determine and optimize a trajectory for the vehicle 100, as will be described further herein. The outputs of the trajectory planning system 140 can include signals operable to cause control of the vehicle 100 such that the vehicle 100 follows the trajectory that is determined by the trajectory planning system 140. As one example, the output of the trajectory planning system 140 can be an optimized trajectory that is supplied to one or more of a steering control system 150 and a throttle control system 160. As one example, the optimized trajectory can be control inputs such as a set of steering angles, with each steering angle corresponding to a point in time or a position. As another example, the optimized trajectory can be one or more paths, lines, and/or curves.

The steering control system 150 is operable to control operation of the steering device 116 in order to cause the steering device 116 to set a desired steering angle K for the front wheels 112 of the vehicle 100. In particular, the steering control system 150 can receive the optimized trajectory from the trajectory planning system 140, then generate and transmit a desired steering system angle to the steering device 116 based on the optimized trajectory. For example, the optimized trajectory that is received from the trajectory planning system 140 can be expressed as a vector of control inputs such as steering angles. The steering control system 150 can process these control inputs by regulating operation of the steering device 116 such that the steering angle specified by the vector of control inputs is obtained at the front wheels 112 as the vehicle 100 progresses along the trajectory that was determined by the trajectory planning system 140.

The throttle control system 160 can receive a velocity profile from the trajectory planning system 140 or can compute a velocity profile based on information received from the trajectory planning system 140 such as the vector of control inputs. Alternative factors or additional factors can be utilized to generate a velocity profile by the throttle control system 160, as is known in the art. The throttle control system 160 is operable to output throttle control signals to the engine 120 for regulating the power supplied by the engine 120 and thus regulating via the speed of the vehicle 100.

Figure 2:
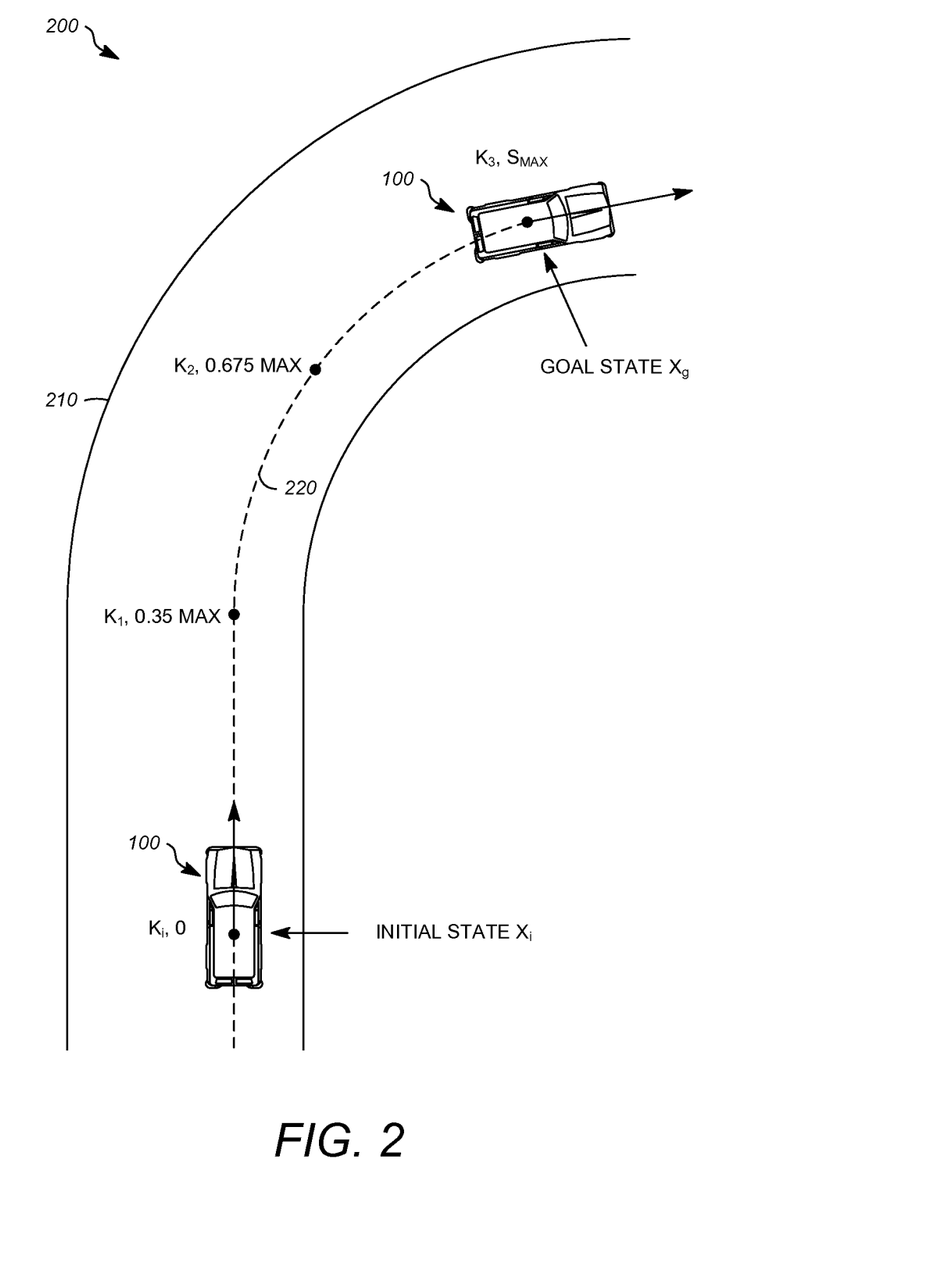
FIG. 2 is an illustration showing an example of vehicle control from an initial state $X_i$ to a goal state $X_d$.

FIG. 2 is an example 200 showing vehicle control along a roadway 210 from an initial state $X_i$ of the vehicle 100 to a goal state $X_g$ of the vehicle 100. The vehicle 100 follows a trajectory 220 from the initial state Xi to the goal state Xg. The state X of the vehicle 100 at any point along the trajectory 220 can be expressed as a function of the position of the vehicle, the angular orientation θ of the vehicle, and the curvature or steering angle K of the vehicle.

The trajectory 220 of the vehicle has a length $S_{max}$, and the current position of the vehicle 100 along the trajectory 220 can be expressed as a fraction of $S_{max}$, ranging from zero to $S_{max}$. Thus, in the illustrated example, the initial state $X_i$ of the vehicle 100 with respect to the trajectory 220 can be expressed as an initial steering angle $K_i$ and distance S=0. A first intermediate state of the vehicle 100 along the trajectory 220 is expressed by steering angle $K_1$ and distance S=0.35 $S_{max}$, while a second intermediate state is described by steering angle $K_2$ and distance of S=0.675 $S_{max}$. The goal state $X_g$ is described by steering angle $K_3$ and distance $S_{max}$.

Figure 3:
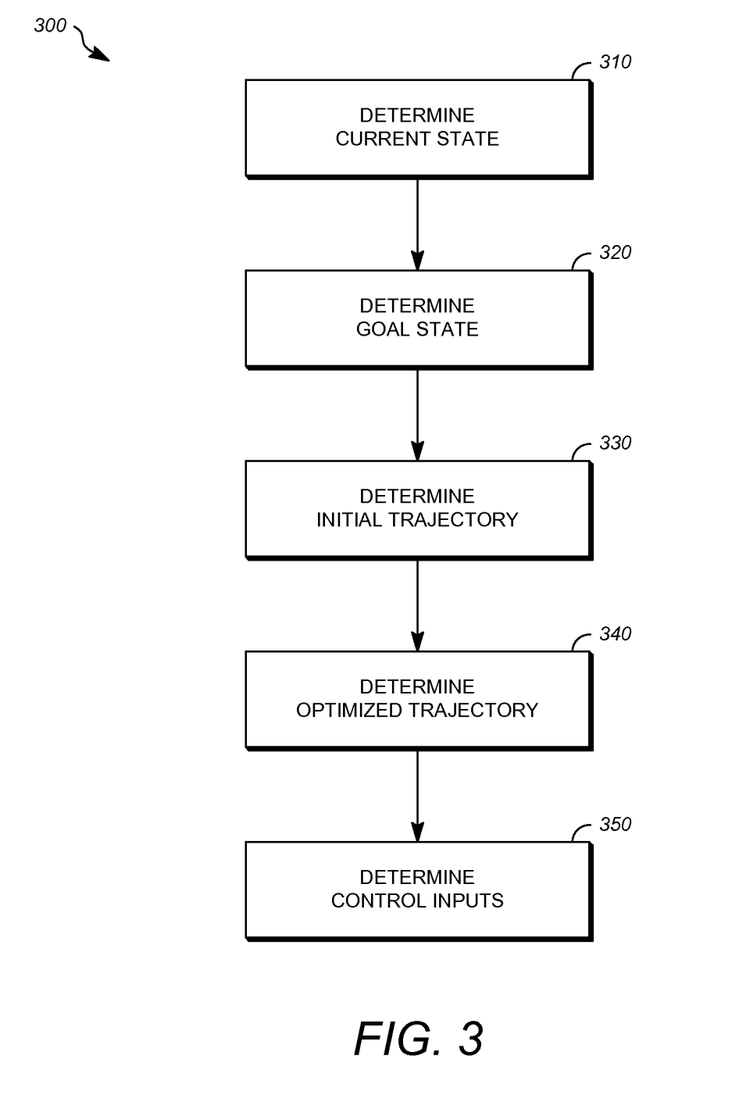
FIG. 3 is a flowchart showing a process for controlling an autonomous vehicle.

FIG. 3 is a flow chart showing a process 300 for controlling an autonomous vehicle. The operations described in connection with the process 300 can be performed by one or more computing devices, such as one or more central processing units. For example, the operations described in connection with the process 300 can be performed by one or more computing devices or central processing units that are included in the trajectory planning system 140. Operations described as being performed by one or more computing devices are considered to be completed when they are completed by a single computing device working alone or by multiple computing devices working together such as in a distributed computing system. The operations described in connection with the process 300 can be embodied as a non-transitory computer readable storage medium including program instructions executable by one or more processors that, when executed, cause the one or more processors to perform the operations. For example, the operations described in connection with the process 300 could be stored at a memory device that is associated with the trajectory planning system 140 and could be executable by a central processing unit or other processor or computing device that is associated with the trajectory planning system 140.

In operation 310, a current state for the vehicle 100 is determined. As previously noted, the current state for the vehicle 100 can include the position of the vehicle 100, which can be expressed in coordinates, such as an x position and a y position. The current state of the vehicle 100 can also include an angular orientation θ of the vehicle. The current state of the vehicle can also include a curvature or wheel angle K of the vehicle.

Determining the current state of the vehicle can be performed by obtaining information from various information sources, such as the sensors 130 of the vehicle. For example, the x and y coordinate position of the vehicle can be obtained from a satellite navigation system that is operable to provide information to the trajectory planning system 140 describing the current position of the vehicle 100. The angular orientation θ of the vehicle 100 can be obtained from one of the sensors 130, such as a magnetometer or other type of electronic compass. As an alternative, the current angular orientation of the vehicle 100 could be obtained by computing the angular orientation mathematically based on a set of previous positions of the vehicle 100. The current curvature or steering angle K of the vehicle 100 can be obtained, for example, from the steering control system 150, based on the steering control signal currently being output by the steering control system 150, which corresponds to a desired steering angle of at least one steered wheel. As an alternative, the sensors 130 can include a steering angle sensor that is operable to measure the current steering angle. Any suitable position sensing device, such as an optical encoder coupled to the steering device 116 can be utilized as a steering angle sensor.

At operation 320, a goal state is determined for the vehicle 100. The goal state corresponds to a desired future position, in terms of x and y coordinates, a desired future angular orientation θ for the vehicle, and a desired future curvature or steering angle K for the vehicle 100.

The goal state can be determined, for example, by the trajectory planning system 140 based on a destination for the vehicle 100. The destination for the vehicle 100 can be, for example, given by a navigation system or user input. The trajectory planning system 140 can define waypoints between the current location of the vehicle and the intended destination and use one of the waypoints as the goal state for the vehicle 100, where the route between the current location and the desired destination is established by the trajectory planning system as a path along a roadway, and the waypoints are established, for example, by subdividing the path in any suitable manner.

At operation 330, the trajectory planning system 140 determines an initial trajectory from the current state of the vehicle to the goal state of the vehicle. In one example, the initial trajectory is determined by fitting a curve from the initial state to the goal state using a vehicle dynamics model. For example, a simple vehicle dynamics model can be utilized to fit a curve to the current state of the vehicle 100 and the goal state of the vehicle 100, such as a bicycle model of vehicle dynamics, as is known in the art.

At operation 340, an optimized trajectory is determined. The optimized trajectory for the vehicle 100 is based on the initial trajectory that was determined at operation 330 and is also based on a velocity profile V. In one example, the velocity profile V is a predetermined value. In another example, the velocity profile V is determined in part based on a vehicle dynamics model. In another example, the velocity profile V is determined at least in part based on the curvature K at one or more points along the initial trajectory. The velocity profile can have a constant value along the trajectory, or can have a changing value along the trajectory.

For the given velocity profile V, the trajectory planning system determines the optimized vehicle trajectory by applying numerical minimization to minimize a trajectory length value and a lateral acceleration value associated with the trajectory. The optimized vehicle trajectory can correspond to a set of control inputs, such as a plurality of steering angle values that are each associated with a discrete location along the optimized vehicle trajectory.

Numerical minimization is performed concurrently for the trajectory length value and the lateral acceleration value. In one implementation, Levenberg-Marquardt minimization is applied to simultaneously minimize the trajectory length value and the lateral acceleration value. The trajectory length value can be a weighted value based on the length of the trajectory. The lateral acceleration value can be a weighted value based on the highest lateral acceleration expected when the vehicle 100 drives according to the trajectory.

The trajectory length value is a function of the length from the current state of the vehicle 100 to the goal state of the vehicle 100. In one implementation, the trajectory length value is the length, measured along the trajectory, from the current state to the goal state, multiplied by a trajectory length weighting factor.

The lateral acceleration value can be a function of the maximum lateral acceleration value that occurs along the trajectory. For example, the maximum lateral acceleration experienced from the current state to the goal state can be estimated as the product of the largest value for the steering angle K and the squared velocity value. In one implementation, the lateral acceleration value is determined by multiplying the maximum lateral acceleration experienced from the current state to the goal state by a lateral acceleration weighting factor.

The trajectory length weighting factor and the lateral acceleration weighting factor are selected to achieve a desired balance between the trajectory length and the lateral acceleration experience by vehicle occupants. In one implementation, for the given velocity profile V, an optimum set of control inputs U are calculated that generate an optimized trajectory X that minimizes:

$$|w_g \times X(S_{max} - X_g), w_a \times la_{max}|^2$$

where $X_g$ is the goal state, $la_{max}$ is the maximum lateral acceleration, $w_g$ is the trajectory length weighting factor and $w_a$ is the lateral acceleration weighting factor.

At operation 350, the control inputs corresponding to the optimized vehicle trajectory are determined. As an example, the control inputs can be determined by applying a vehicle dynamics model to the optimized vehicle trajectory. The control inputs can be, for example, a set of steering angles that correspond to discrete locations along the optimized vehicle trajectory. The optimized trajectory is then utilized, for example by the steering control system 150.

Figure 4:
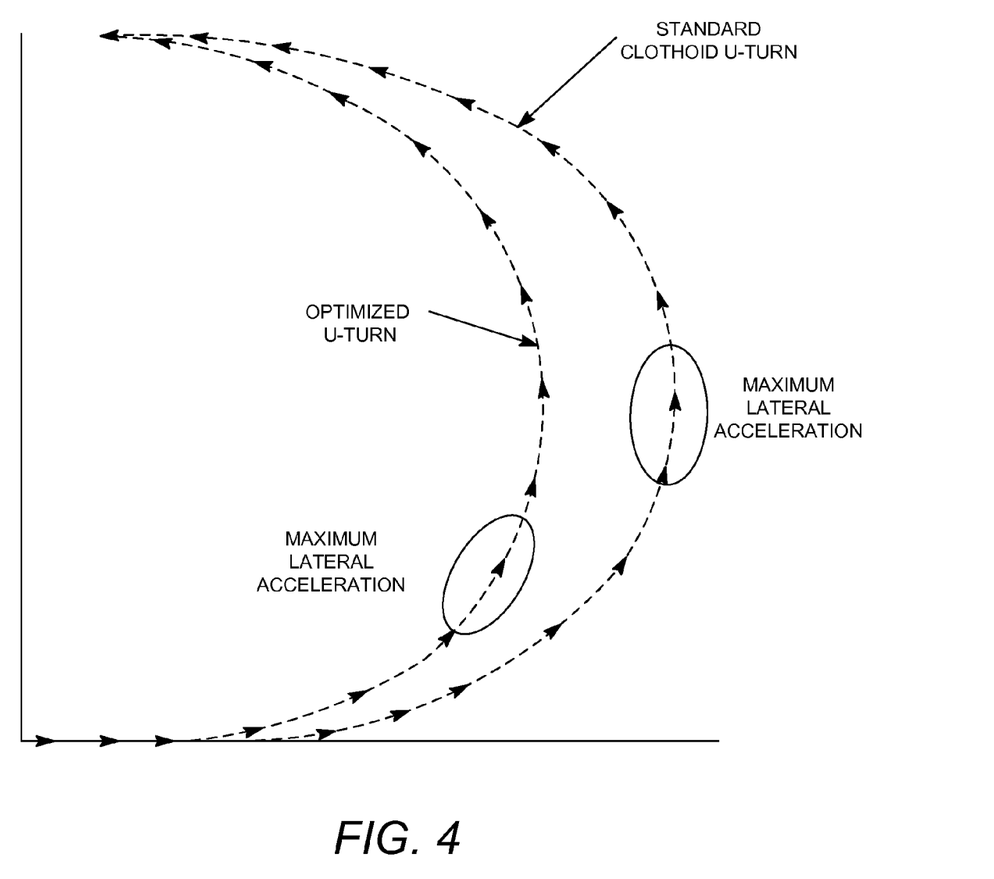
FIG. 4 is an illustration comparing a standard clothoid U-turn to an optimized U-turn.
Figure 5:
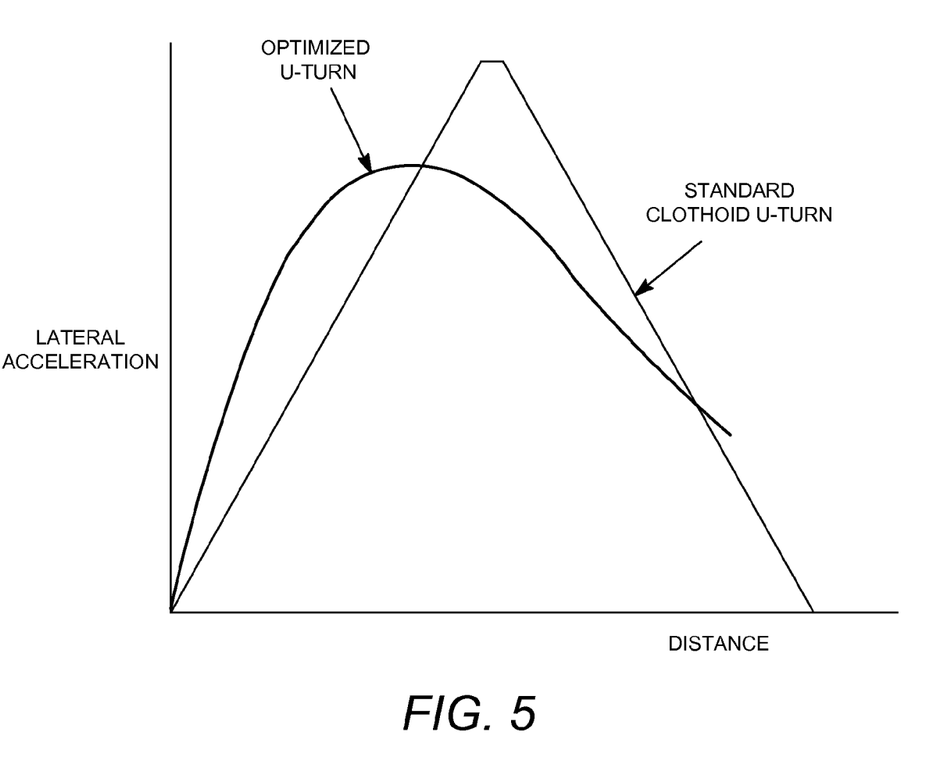
FIG. 5 is an illustration comparing lateral acceleration values experience during the clothoid U-turn and the optimized U-turn of FIG. 4.

FIGS. 4-5 are illustrations comparing a standard clothoid U-turn to an optimized U-turn. In FIG. 4, the X and Y axes are both expressed in terms of units of distance. The optimized U-turn shown in FIG. 4 is characterized by earlier turn-in, smaller maximum radius, and earlier development of maximum lateral acceleration as compared to the standard clothoid U-turn. FIG. 5 shows distance traveled along the trajectory on the X axis compared to lateral acceleration values on the Y axis. The lateral acceleration values for the optimized U-turn increase non-linearly and peak earlier than the lateral acceleration values experienced during the standard clothoid U-turn, which increase linearly and then decrease linearly, with a peak value higher than that experienced in the optimized U-turn.

While the description herein is made with respect to specific implementations, it is to be understood that the invention is not to be limited to the disclosed implementations but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for controlling an autonomous vehicle, comprising:
    obtaining, by one or more processors, information describing a current state of the autonomous vehicle and a goal state of the autonomous vehicle;
    determining, by the one or more processors, an initial vehicle trajectory from the current state of the autonomous vehicle to the goal state of the autonomous vehicle;
    determining, by the one or more processors, an optimized vehicle trajectory using the initial vehicle trajectory and a velocity profile along the initial vehicle trajectory by applying numerical minimization that concurrently minimizes a trajectory length value and a lateral acceleration value; and
    controlling the autonomous vehicle to traverse the optimized vehicle trajectory.

2. The method of claim 1, wherein the optimized vehicle trajectory corresponds to a set of control inputs and reaches a maximum lateral acceleration value earlier than the initial vehicle trajectory.

3. The method of claim 2, wherein the set of control inputs includes a plurality of steering angle values that are each associated with a discrete location along the optimized vehicle trajectory.

4. The method of claim 1, wherein the velocity profile is predetermined, and determining the optimized vehicle trajectory does not include modifying the velocity profile.

5. The method of claim 1, wherein the trajectory length value is a function of a length from the current state to the goal state and a trajectory length weighting factor, and the lateral acceleration value is a function of a maximum lateral acceleration value from the current state to the goal state and a lateral acceleration weighting factor.

6. The method of claim 1, wherein the determining the initial vehicle trajectory comprises fitting a curve to the current state of the autonomous vehicle and the goal state of the autonomous vehicle using a vehicle dynamics model.

7. The method of claim 1, wherein determining the optimized vehicle trajectory is performed by applying Levenberg-Marquardt minimization.

8. A control apparatus for an autonomous vehicle, comprising:
    one or more processors; and
    one or more memory devices for storing program instructions used by the one or more processors, wherein the program instructions, when executed by the one or more processors, cause the one or more processors to:
    obtain information describing a current state of the autonomous vehicle and a goal state of the autonomous vehicle,
    determine an initial vehicle trajectory from the current state of the autonomous vehicle to the goal state of the autonomous vehicle, and
    determine an optimized vehicle trajectory using the initial vehicle trajectory and a velocity profile along the initial vehicle trajectory by applying numerical minimization that concurrently minimizes a trajectory length value and a lateral acceleration value; and
    control the autonomous vehicle to traverse the optimized vehicle trajectory.

9. The control apparatus of claim 8, wherein the optimized vehicle trajectory corresponds to a set of control inputs.

10. The control apparatus of claim 9, wherein the set of control inputs includes a plurality of steering angle values that are each associated with a discrete location along the optimized vehicle trajectory.

11. The control apparatus of claim 8, wherein the velocity profile is predetermined, and determining the optimized vehicle trajectory does not include modifying the velocity profile.

12. The control apparatus of claim 8, wherein the trajectory length value is a function of a length from the current state to the goal state and a trajectory weighting factor, and the lateral acceleration value is a function of a maximum lateral acceleration value from the current state to the goal state and a lateral acceleration weighting factor.

13. The control apparatus of claim 8, wherein the determining the initial vehicle trajectory comprises fitting a curve to the current state of the autonomous vehicle and the goal state of the autonomous vehicle using a vehicle dynamics model.

14. The control apparatus of claim 8, wherein determining the optimized vehicle trajectory is performed by applying Levenberg-Marquardt minimization.

15. An autonomous vehicle, comprising:
    a trajectory planning system that includes one or more processors and one or more memory devices for storing program instructions used by the one or more processors, wherein the program instructions, when executed by the one or more processors, cause the one or more processors to:
    obtain information describing a current state of the autonomous vehicle and a goal state of the autonomous vehicle,
    determine an initial vehicle trajectory from the current state of the autonomous vehicle to the goal state of the autonomous vehicle, and
    determine an optimized vehicle trajectory using the initial vehicle trajectory and a velocity profile along the initial vehicle trajectory by applying numerical minimization that concurrently minimizes a trajectory length value and a lateral acceleration value;
    a steering device that is operable to change a steering angle of at least one steered wheel; and
    a steering control system operable to output a steering control signal to the steering device for controlling operation of the steering device, wherein the steering control system generates the steering control signal based on the optimized vehicle trajectory.

16. The autonomous vehicle of claim 15, wherein the optimized vehicle trajectory corresponds to a set of control inputs.

17. The control apparatus of claim 16, wherein the set of control inputs includes a plurality of steering angle values that are each associated with a discrete location along the optimized vehicle trajectory.

18. The autonomous vehicle of claim 15, wherein the velocity profile is predetermined, and determining the optimized vehicle trajectory does not include modifying the velocity profile.

19. The autonomous vehicle of claim 15, wherein the trajectory length value is a function of a length from the current state to the goal state and a trajectory weighting factor, and the lateral acceleration value is a function of a length from the current state to the goal state and a lateral acceleration weighting factor.

20. The autonomous vehicle of claim 15, wherein the determining the initial vehicle trajectory fitting the trajectory to the current state of the autonomous vehicle and the goal state of the autonomous vehicle using a vehicle dynamics model.

21. The autonomous vehicle of claim 15, wherein determining the optimized vehicle trajectory is performed by applying Levenberg-Marquardt minimization.

* * * * *